United States Patent
Li et al.

(10) Patent No.: US 7,976,717 B2
(45) Date of Patent: Jul. 12, 2011

(54) METHOD OF FORMING POLARIZATION REVERSAL AREA, APPARATUS THEREOF AND DEVICE USING IT

(75) Inventors: Xijun Li, Tsurugashima (JP); Kazuya Terabe, Tsukuba (JP); Kenji Kitamura, Tsukuba (JP); Hideki Hatano, Tsukuba (JP)

(73) Assignee: National Institute for Materials Science, Tsukuba-Shi, Ibaraki (JP)

( * ) Notice: Subject to any disclaimer, the term of this patent is extended or adjusted under 35 U.S.C. 154(b) by 624 days.

(21) Appl. No.: 12/084,061

(22) PCT Filed: Oct. 25, 2006

(86) PCT No.: PCT/JP2006/321805
§ 371 (c)(1),
(2), (4) Date: Jun. 12, 2008

(87) PCT Pub. No.: WO2007/049793
PCT Pub. Date: May 3, 2007

(65) Prior Publication Data
US 2009/0130476 A1    May 21, 2009

(30) Foreign Application Priority Data
Oct. 25, 2005 (JP) .................................. 2005-309766

(51) Int. Cl.
*B44C 1/22* (2006.01)
*C03C 15/00* (2006.01)
*C03C 25/68* (2006.01)
*C23F 1/00* (2006.01)
*C25F 3/00* (2006.01)

(52) U.S. Cl. .......................................... 216/87; 438/745

(58) Field of Classification Search .................... 216/87, 216/94; 438/745
See application file for complete search history.

(56) References Cited

U.S. PATENT DOCUMENTS

| | | | |
|---|---|---|---|
| 5,382,334 A * | 1/1995 | Miyaguchi et al. | 361/225 |
| 7,115,513 B2 * | 10/2006 | Chiang et al. | 438/689 |
| 2005/0002605 A1 | 1/2005 | Sakai et al. | |
| 2005/0181525 A1 | 8/2005 | Tokuda et al. | |

FOREIGN PATENT DOCUMENTS

| | | |
|---|---|---|
| JP | H07-013008 | 1/1995 |
| JP | H08-015741 | 1/1996 |
| JP | 2003-215379 | 7/2003 |

* cited by examiner

Primary Examiner — Roberts Culbert
(74) Attorney, Agent, or Firm — Manabu Kanesaka (57) ABSTRACT

Provided are a method and an apparatus for forming a nanometer-order polarization-reversed region in a ferroelectric single crystal, and a device using the ferroelectric single crystal.

The method according to the present invention for forming a polarization-reversed region in a ferroelectric single crystal includes the steps of grounding a first surface of the ferroelectric single crystal, and irradiating a second surface of the ferroelectric single crystal opposite to the first surface with an ion beam. The ion beam is irradiated such that the charge density Q ($\mu C/cm^2$) accumulated on the second surface irradiated with the ion beam satisfies the following relationship:

$$0.7 \times Ps \leq Q \leq 5 \times Ps$$

where Ps is the spontaneous polarization ($\mu C/cm^2$) of the ferroelectric single crystal.

15 Claims, 7 Drawing Sheets

Prior art

US 7,976,717 B2

METHOD OF FORMING POLARIZATION REVERSAL AREA, APPARATUS THEREOF AND DEVICE USING IT

TECHNICAL FIELD

The present invention relates to a method and an apparatus for forming a polarization-reversed region in a ferroelectric single crystal, and a device using the ferroelectric single crystal. More particularly, the present invention relates to a method and an apparatus for forming in a ferroelectric single crystal a desired pattern, in particular, a nanometer-order polarization-reversed region, as well as to a device using the ferroelectric single crystal.

BACKGROUND ART

Recently, techniques have been developed for forming a polarization-reversed region in a ferroelectric single crystal having a desirable nonlinear optical constant and an electro-optic coefficient. Apparatuses for these techniques have also been developed, as have devices using such ferroelectric single crystals. For example, optical devices, such as optical frequency modulators and wavelength converters, that use the ferroelectric single crystals with a polarization-reversed region are intensely studied.

Among known techniques for forming a polarization-reversed layer on a ferroelectric single crystal are those using ion beams or electron beams (See, for example, Patent Documents 1 and 2).

Figure 13:
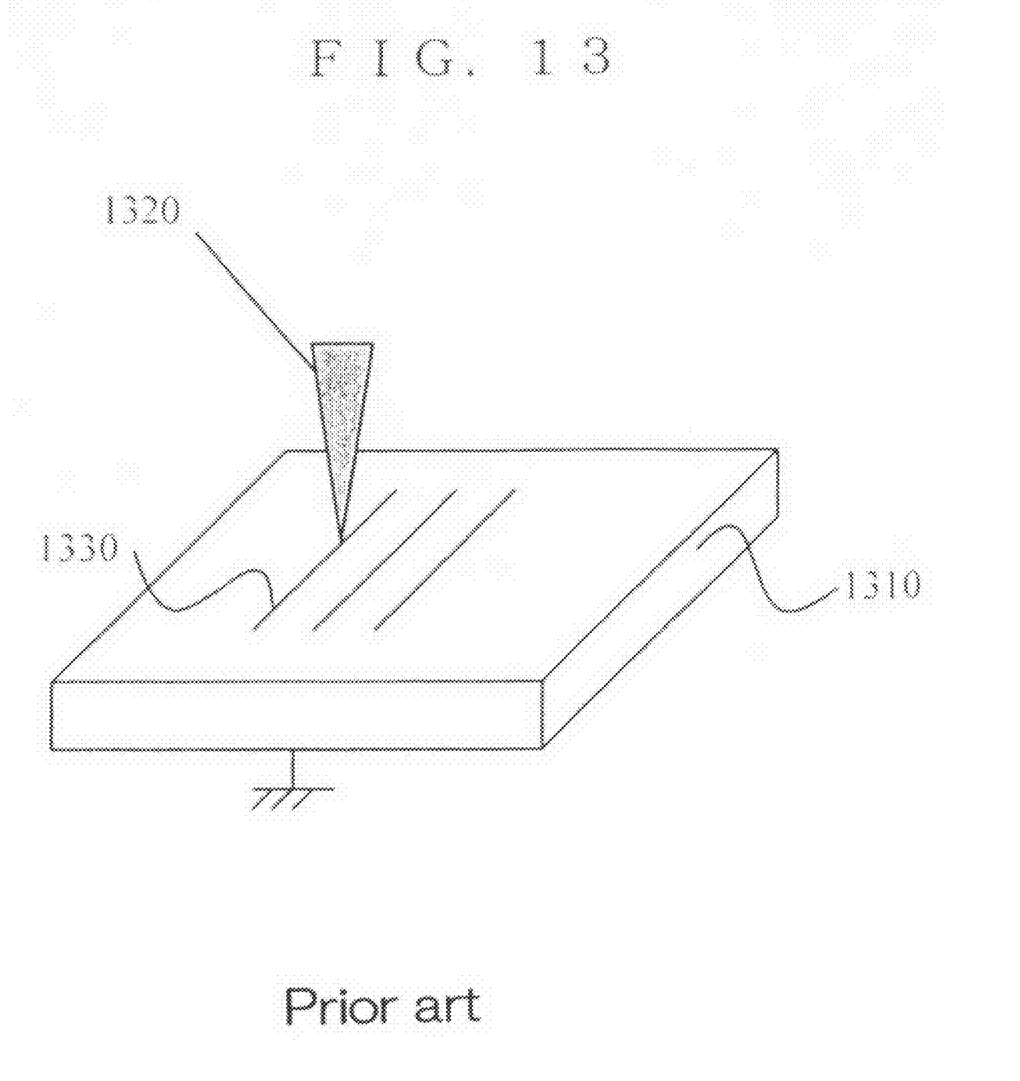
FIG. 13 is a diagram showing how a polarization-reversed layer is produced by a conventional technique.

FIG. 13 is a diagram showing how a polarization-reversed layer is produced by one such technique.

Step S1310: A ferroelectric substrate 1310 having nonlinear optical effect is grounded. The ferroelectric substrate may be a $LiTaO_3$ substrate that is a Z-plate.

Step S1320: A beam of positive ion 1320, accelerated by a predetermined acceleration voltage, is focused on the side of the ferroelectric substrate 1310 that has been positively polarized as a result of spontaneous polarization of the ferroelectric substrate 1310. The ion beam may be a $Si^{2+}$ ion beam.

Step S1330: The surface of the ferroelectric substrate 1310 is scanned by the focused ion beam 1320 in a periodic pattern 1330.

According to this technique, a periodically polarization-reversed layer can be formed by using a focused ion beam, and the need to form a mask is eliminated. As a result, the contamination with impurities that occurs during the masking can be prevented and the masking process itself can be omitted. Not only can the ion beam form the polarization-reversed layer to a considerable depth into the ferroelectric substrate, but it can also form the polarization-reversed layer in a periodic pattern with short periodicity. Such a polarization-reversed layer can be used to produce highly efficient wavelength converters.

Patent Document 1: JP-A-06-186604
Patent Document 2: JP-A-06-342111

DISCLOSURE OF THE INVENTION

Problems to be Solved by the Invention

Recent technological innovation has led to a need for the development of novel devices using nanometer-order polarization-reversed structures (polarization-reversed regions) that are finer than ever. However, the technologies described in Patent Documents 1 and 2 are not suitable for forming nanometer-order polarization-reversed structures since they involve high acceleration voltages (for example, 100 kV to 200 kV) that can cause significant damage to the material. Thus, no ion beam-based technique has ever been established that is suitable for forming fine polarization-reversed structures in the order of nanometers.

Accordingly, it is an object of the present invention to provide an ion beam-based method and an apparatus for forming a nanometer-order polarization-reversed region in a ferroelectric single crystal, and a device using such a ferroelectric single crystal.

Means for Solving the Problem

To achieve the above-described object, a method for forming a polarization-reversed region in a ferroelectric single crystal according to the present invention includes the steps of grounding a first surface of the ferroelectric single crystal, and irradiating a second surface of the ferroelectric single crystal opposite to the first surface with an ion beam, the ion beam being irradiated such that the charge density Q ($\mu C/cm^2$) accumulated on the second surface irradiated with the ion beam satisfies the following relationship:

$$0.7 \times Ps \leq Q \leq 5 \times Ps$$

where Ps is the spontaneous polarization ($\mu C/cm^2$) of the ferroelectric single crystal.

To achieve the above-described object, a device according to the present invention is produced by a method for forming a polarization-reversed region in a ferroelectric single crystal, the method including the steps of grounding a first surface of the ferroelectric single crystal, and irradiating a second surface of the ferroelectric single crystal opposite to the first surface with an ion beam, the ion beam being irradiated such that the charge density Q ($\mu C/cm^2$) accumulated on the second surface irradiated with the ion beam satisfies the following relationship:

$$0.7 \times Ps \leq Q \leq 5 \times Ps$$

where Ps is the spontaneous polarization ($\mu C/cm^2$) of the ferroelectric single crystal.

To achieve the above-described object, a device according to the present invention includes an electrode layer, a cladding layer disposed on the electrode layer, and a slab layer disposed on the cladding layer, the slab layer being formed of a ferroelectric single crystal having a plurality of holes arranged at a predetermined periodicity, the slab layer also having a higher refractive index than that of the cladding layer.

To achieve the above-described object, an apparatus for forming a polarization-reversed region in a ferroelectric single crystal according to the present invention includes an ion beam source for irradiating the ferroelectric single crystal with an ion beam, and a control unit for controlling the ion beam source such that the charge density Q ($\mu C/cm^2$) accumulated by the ferroelectric single crystal with irradiation of the ion beam satisfies the following relationship:

$$0.7 \times Ps \leq Q \leq 5 \times Ps$$

where Ps is the spontaneous polarization ($\mu C/cm^2$) of the ferroelectric single crystal.

Advantage of the Invention

The method for forming a polarization-reversed region in a ferroelectric single crystal according to the present invention includes the steps of grounding a first surface of the ferroelectric single crystal, and irradiating a second surface of the ferroelectric single crystal opposite to the first surface with an ion beam. The ion beam is irradiated such that the charge density Q ($\mu C/cm^2$) accumulated on the second surface irradiated with the ion beam satisfies the following relationship:

$$0.7 \times Ps \leq Q \leq 5 \times Ps$$

where Ps is the spontaneous polarization ($\mu C/cm^2$) of the ferroelectric single crystal. In this manner, the lateral expansion of electric field caused by the accumulated ion can be prevented. The above-described condition also applies to the case using focused ion beams (FIBs), facilitating the formation of nanometer-order polarization-reversed regions that are finer than ever.

EXPLANATION OF REFERENCE SYMBOLS

200: ferroelectric single crystal
210, 520: electrode layer
220: ion beam
230, 240, 310, 320: region
250: deflected ion
300: control layer
400: apparatus
410: ion beam source
420: control unit
500: wavelength converter
510, 610: substrate
520, 630: cladding layer
530: ferroelectric single crystal
540: ridge-shaped waveguide
550: first polarization-reversed region
560: second polarization-reversed region
600: device
620: electrode layer
640: slab layer
650: plurality of holes
660: line defect
670: spacer

BEST MODE FOR CARRYING OUT THE INVENTION

Embodiments of the present invention will now be described with reference to the accompanying drawings.

Embodiment 1

Figure 1:
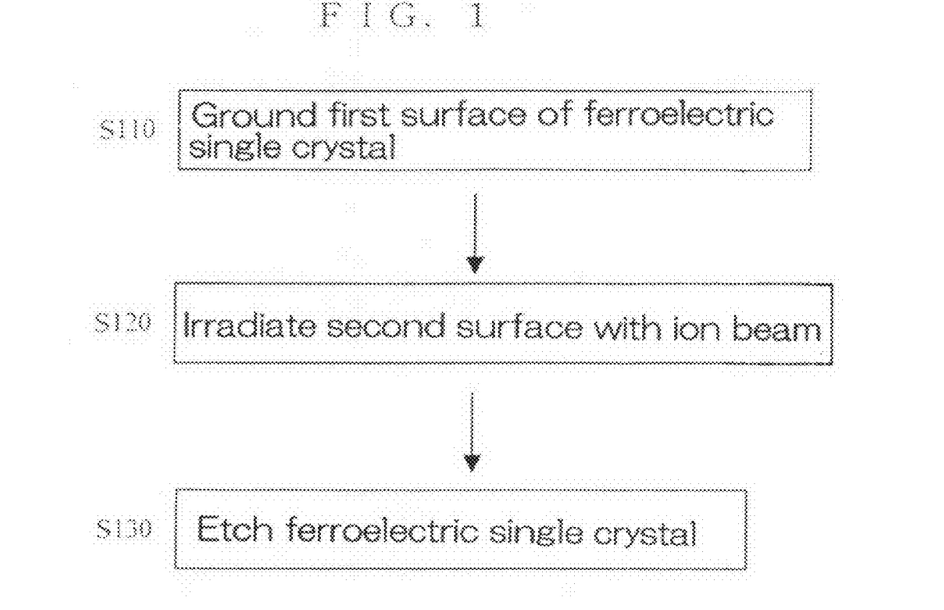
FIG. 1 is a flowchart showing a method for forming a polarization-reversed region in a ferroelectric single crystal according to the present invention.

FIG. 1 is a flowchart showing a method for forming a polarization-reversed region in a ferroelectric single crystal according to the present invention.

Figure 2:
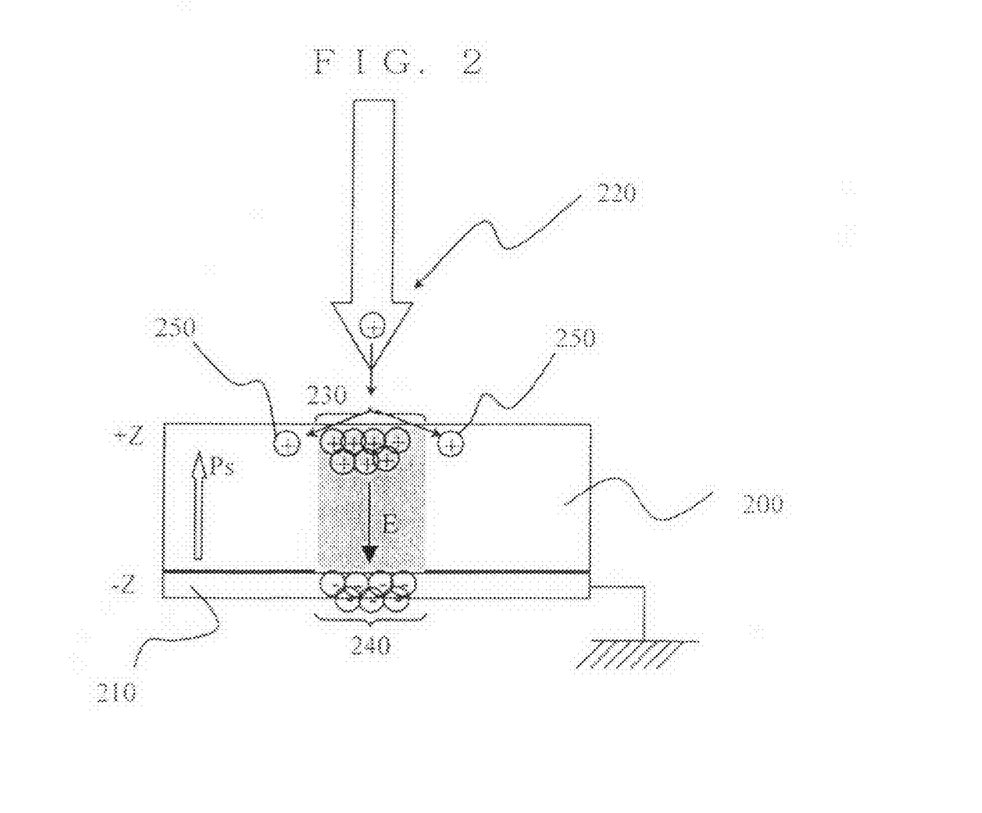
FIG. 2 is a diagram showing the mechanism of how a polarization-reversed region is formed in a ferroelectric single crystal according to the present invention.

FIG. 2 is a diagram showing the mechanism of how a polarization-reversed region is formed in a ferroelectric single crystal according to the present invention.

The method is now described step by step with reference to FIG. 2.

Step S110: A first surface of a ferroelectric single crystal 200 is grounded. While the ferroelectric single crystal 200 may be any ferroelectric single crystal, it is preferably a ferroelectric single crystal having nonlinear optical effect with 180° domain for optical applications. When a ferroelectric single crystal has a 180° domain, its polarization can be readily reversed and the reversed polarization can be maintained.

More preferably, the ferroelectric single crystal may be congruent lithium niobate (which is referred to simply as "CLN," hereinafter), congruent lithium tantalate (which is referred to simply as "CLT," hereinafter), substantially stoichiometric lithium niobate (which is referred to simply as "SLN," hereinafter), or substantially stoichiometric lithium tantalate (which is referred to simply as "SLT," hereinafter).

These materials have 180° domain, desirable piezoelectric effect, pyroelectric effect, electro-optical effect and nonlinear optical effect and are expected to exhibit novel characteristics when combined with nanometer-order polarization-reversed regions. They also have higher nonlinear optical constants (d constants) than other ferroelectric single crystals and are therefore suitable for optical applications. In addition, since techniques to process these materials are already established, it is expected that they will soon be used in commercial products in a wide range of applications.

SLN and SLT may contain 0.1 to 3.0 mol % of elements selected from the group consisting of Mg, Zn, Sc and In. These elements serve to reduce optical damage.

As used herein, the term "substantially stoichiometric" is intended to mean that the molar fraction of $Li_2O/(Nb_2O_5+Li_2O)$ or $Li_2O/(Ta_2O_5+Li_2O)$ has a value of 0.495 to 0.50, which is closer to the stoichiometric ratio than it is to the congruent composition, though the value may not be exactly 0.50.

Assuming that $\lambda$ is the wavelength of light incident upon the ferroelectric single crystal 200, the thickness of the ferroelectric single crystal 200 is preferably from $\lambda/2$ to $2 \times \lambda$. When the thickness of the ferroelectric single crystal 200 is in this range, the ferroelectric single crystal 200 can confine the incident light in the lateral mode and can thus achieve improved light confinement.

While the ferroelectric single crystal 200 can be produced by various single crystal growth techniques, such as double-crucible Czochralski method (DCCZ) with an automatic powder supply system, Czochralski method (CZ) and zone melt method (ZM), it may be a thin film produced by various physical or chemical vapor deposition techniques, such as molecular beam epitaxy (MBE) and metal-organic chemical vapor deposition (MOCVD), or liquid phase epitaxy, such as sol-gel method.

The first surface of the ferroelectric single crystal 200 is −Z surface (−C surface) and preferably includes an electrode layer 210 to serve as a grounding electrode. The electrode layer 210 may be a metal thin film, such as Cr thin film, Pt thin film, Au thin film and AuPd thin film, or a transparent conductive film, such as ITO thin film and ZnO thin film.

The ferroelectric single crystal 200 preferably includes an insulation layer (not shown) between the first surface of the ferroelectric single crystal 200 and the electrode layer 210. The insulation layer has a lower refractive index than that of the ferroelectric single crystal 200. This construction helps make highly efficient devices by ensuring that the light guided through the ferroelectric single crystal 200 is confined within the crystal.

The insulation layer may be a $SiO_x$ ($1 \leq x \leq 2$) film. One important factor that must be considered when providing the insulation layer between the ferroelectric single crystal 200 and the electrode layer 210 is the thickness of the insulation layer. Specifically, if the insulation layer is too thick, it can prevent the generation of sufficient electric field required to reverse the polarization of the ferroelectric single crystal 200 from occurring. Conversely, if the insulation layer is too thin, the light entering the ferroelectric single crystal 200 may seep out, lowering the confinement effect of the ferroelectric single crystal 200, although a sufficiently strong electric field can be generated within the ferroelectric single crystal 200 at this thickness. Thus, the thickness of the insulation layer is preferably in the range of 1.5 µm to 2.5 µm. The insulation layer having a thickness within this range can effectively confine light within it and does not prevent the polarization reversal of the ferroelectric single crystal 200 from taking place.

Alternatively, the ferroelectric single crystal 200 may include an insulation layer (not shown) on the electrode layer 210. In such a case, the electrode layer 210 may be a transparent conductive film (transparent electrode layer) that has a specific refractive index and a specific dielectric constant so that the electrode layer does not interrupt the propagation of light. The insulation layer has a lower refractive index than that of the ferroelectric single crystal 200. In this case, the ferroelectric single crystal 200 is in direct contact with the electrode layer 210, so that an electric field strong enough to cause polarization reversal is readily generated within the ferroelectric single crystal 200. The insulation layer can therefore have any thickness and may preferably have a larger thickness.

According to the present invention, the insulation layer provided on the first surface side of the ferroelectric single crystal 200 does not necessarily have to have higher insulation performance than that the ferroelectric single crystal 200. It should be understood that the insulation layer is formed of a low-conductive material that can serve as a cladding layer.

The electrode layer 210 and the insulation layer can be formed on the ferroelectric single crystal 200 in any order. For example, first, the electrode layer 210 and then the insulation layer may be deposited on a support substrate and, subsequently, the ferroelectric single crystal 200 is joined to, or deposited on, the substrate. Alternatively, first the insulation layer and then the electrode layer 210 may be deposited on the first surface of the bulk ferroelectric single crystal 200, which is then joined to a support substrate.

Similarly, when the electrode layer 210 is a transparent conductive film, first the insulation layer and then the electrode layer 210 may be deposited on a support substrate and, subsequently, the ferroelectric single crystal 200 is joined to, or deposited on, the substrate. Alternatively, first the electrode layer 210 and then the insulation layer may be deposited on the first surface of the bulk ferroelectric single crystal 200, which is then joined to a support substrate.

Step S120: An ion beam 220 is irradiated onto a second surface of the ferroelectric single crystal 200. The second surface is the surface opposite to the first surface and is +Z surface (+C surface). Upon irradiation of the ion beam 220, the second surface of the ferroelectric single crystal 200 accumulates charge (ion).

The ion beam 220 is irradiated such that the charge density Q (µC/cm$^2$) accumulated on the second surface satisfies the following relationship:

$$0.7 \times Ps \leq Q \leq 5 \times Ps$$

where Ps is the spontaneous polarization (µC/cm$^2$) of the ferroelectric single crystal 200. If the beam is irradiated so that the charge density Q satisfies the above relationship, the lateral expansion of electric field caused by the accumulated ion can be prevented. Thus, the ion beam 220 that has been focused to a beam diameter of about several tens of nanometers (focused ion beam 220) can effectively reverse the polarization in a predetermined region.

The charge density Q is preferably about 2×Ps. By saying "about 2×Ps," it means that the charge density Q includes a ±10% error, or $1.8 \times Ps \leq Q \leq 2.2 \times Ps$ (This applies to the rest of the description). When the charge density is within this range, the growth of the domain in the direction perpendicular to the electric field can be further suppressed, enabling the formation of a polarization-reversed region having a desirable nanometer-order geometry.

The ion beam 220 may be accelerated by an acceleration voltage of 20 KeV to 40 KeV. The diameter of the ion beam accelerated by an acceleration voltage within this range can be controlled to 6 nm at minimum by adjustment of beam aperture of the apparatus or the like. Such an ion beam can effectively form nanometer-order polarization-reversed regions.

The ion species of the ion beam 220 is typically gallium ion (Ga$^+$). The ion species is preferably an ion species that can remain at the surface of the ferroelectric substance.

The ion beam 220 may be irradiated in a desired pattern, such as lines and dots, that suits the desired application of a particular device. A line pattern results in a one-dimensional photonic crystal while a dot pattern results in a two-dimensional photonic crystal. As used herein, the term "one-dimensional photonic crystal" is intended to mean that light is guided by the photonic crystal in a one-dimensional direction and the term "two-dimensional photonic crystal" is intended to mean that light is guided by the photonic crystal in a two-dimensional direction. Neither term is intended to mean that the structure of the crystals is one-dimensional or two-dimensional.

As shown in FIG. 2, a positive charge is accumulated in a region 230 of the +Z surface of the ferroelectric single crystal 200 irradiated with the ion beam 220, whereas a negative charge is accumulated in a region 240 of the −Z surface of the ferroelectric single crystal 200 opposite to the region 230 that accumulates the positive charge. As a result, an electric field E is generated that is directed from the region 230 of the +Z surface to the region 240 of the −Z surface.

If the charge density Q that generates the electric field E is such that $0.7 \times Ps \leq Q \leq 5 \times Ps$, the polarization of any desired region can be reversed. In particular, if the charge density Q is about $2 \times Ps$, the polarization can be reversed in a desired region alone.

During the irradiation of the ion beam 220, the Coulomb repulsive force caused by the positive charge that has already been accumulated in the region 230 deflects the ions of the ion beam 220, so that the deflected ions 250 may result in the lateral expansion of the electric field (or distribution of electric field). When the charge density Q is within the above-described range, however, the effect of deflected ions can be virtually neglected.

However, if the charge density Q of the ion beam 220 is improper, the magnitude of the electric field E will not be large enough to cause the polarization reversal, or the effect of the distribution of the electric field cannot be neglected, causing unnecessary reversal of the polarization.

Since the object of the conventional techniques was to form polarization-reversed regions in the order of micrometers, the conditions described by the conventional techniques cannot be applied to the formation of polarization-reversed regions using a more focused beam. In the course of the extensive studies, the present inventors successfully determined the optimum conditions for irradiating ion beams with different beam diameters. It should be understood by those who are skilled in the art that such conditions can be determined only through repeated experiments and cannot readily be conceived of in light of the state of the art at the time that the invention was made.

Figure 3:
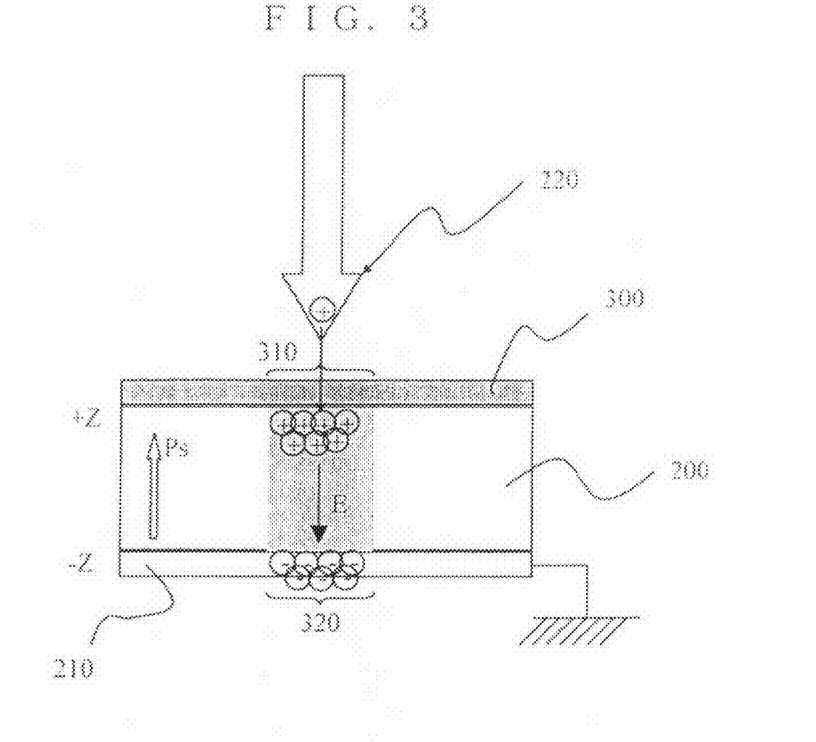
FIG. 3 is a diagram showing another mechanism of how a polarization-reversed region is formed in a ferroelectric single crystal according to the present invention.

FIG. 3 is a diagram showing another mechanism of how a polarization-reversed region is formed in a ferroelectric single crystal according to the present invention.

The second surface of the ferroelectric single crystal 200 preferably includes a control layer 300 for controlling the electric field distribution. The control layer 300 is formed of a low-conductivity material and does not necessarily have to have higher insulation performance than that of the ferroelectric single crystal 200. The control layer 300 serves to control the movement of ions.

The control layer 300 may be formed of polymethylmethacrylate (PMMA), ZEP520 (a positive resist manufactured by Zeon Corp.), polyvinyl alcohol (PVA), a nitride, such as $SiN_x$ ($1<x<2$) and $AlN_x$ ($0.5$ $x<1.5$), or an oxide, such as $SiO_x$ ($1 \leq x \leq 2$) and $Al_2O_3$. Preferably, the control layer 300 is formed of PMMA or ZEP520. Such a control layer 300 can be readily applied to the ferroelectric single crystal 200. The control layer 300 can not only firmly adhere to the ferroelectric single crystal 200, but can also be readily removed from the ferroelectric single crystal 200.

It should be understood that the term "PMMA" as used herein is intended to mean a polymer having a PMMA backbone with its molecular weight controlled in the range of 5,000 to 2,000,000. The control layer can be applied by a known technique such as spin coating and dip coating. The thickness of the control layer 300 is preferably in the range of 50 nm to 500 nm. The control layer 300 having such a thickness can effectively prevent the expansion of electric field distribution, as will be described later.

The mechanism of how the control layer 300 prevents the lateral expansion of electric field is now described.

As described above with reference to FIG. 2, a positive charge is accumulated in the region 310 in the +Z surface of the ferroelectric single crystal 200 irradiated with the ion beam 220. If the ion beam 220 is continuously irradiated onto the region 310 that has already accumulated the positive charge, the additional ions are confined in the control layer 300 and will not be deflected laterally. The control layer 300 also prevents the penetration of the ion beam into the sample (i.e., direct penetration into the ferroelectric single crystal 200), protecting the sample against damages. This ion confinement effect becomes most significant when the thickness of the control layer 300 is in the range of 50 to 500 nm.

As in FIG. 2, a negative charge is accumulated in a region 320 of the −Z surface of the ferroelectric single crystal 200 opposite to the region 310 storing the positive charge. As a result, an electric field E is generated that is directed from the region 310 of the +Z surface to the region 320 of the −Z surface. If the charge density Q that generates the electric field E is within the above-described range, the polarization reversal can be achieved. Since the control layer 300 prevents the ions from being deflected, the effect of the lateral expansion of the electric field distribution is eliminated and the polarization can be reliably reversed only in a desired region. This technology is particularly suitable for fine processing in the order of nanometers.

Reference is now made again to FIG. 1.

Step S130: Depending on the application of the device, the ferroelectric single crystal 200 may be etched following Step S120. When the ferroelectric single crystal 200 is CLN, CLT, SLN or SLT, a mixed solution containing hydrofluoric acid and nitric acid at a predetermined ratio may be used as an etchant. The etchant can etch only the region in which the polarization has been reversed in Step S120 (in the −Z surface), leaving the remaining region unetched. The mixing ratio of hydrofluoric acid to nitric acid is determined based on the trade-off between the etching speed and the roughness of the etched surface. For example, the mixing ratio of the acids may be 1:0, 1:1 or 1:2 (hydrofluoric acid:nitric acid). A higher concentration of hydrofluoric acid results in a faster etching speed while a lower concentration of hydrofluoric acid results in a slower etching speed. The etching process can be used to form a slab structure that suits a particular application.

Following Step S130, the insulation layer deposited on the side of the first surface to serve as a cladding layer may be removed by etching. After removal of the insulation layer, the cladding layer is an air layer having a lower refractive index than that of the insulation layer, so that light can be confined more effectively. The etchant for etching the insulation layer can be readily conceived of by those skilled in the art.

Figure 4:
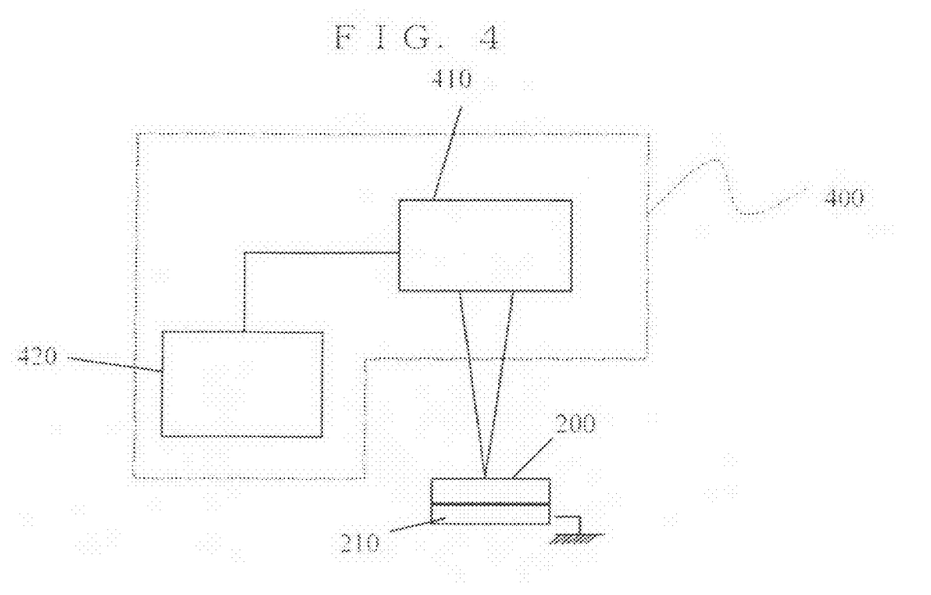
FIG. 4 is a schematic diagram showing an apparatus for forming a polarization-reversed region according to the present invention.

FIG. 4 is a schematic diagram showing an apparatus for forming a polarization-reversed region according to the present invention.

The apparatus 400 includes an ion beam source 410 and a control unit 420. The ion beam source 410 emits the above-described ion species toward the ferroelectric single crystal 200. The control unit 420 controls the operation of the ion beam source 410.

Specifically, the control unit 420 controls the operation of the ion beam source 410 so that the charge density Q accumulated on the second surface of the ferroelectric single crystal 200 (FIG. 1) by the ion beam emitted from the ion beam source 410 satisfies $0.7 \times Ps \leq Q \leq 5 \times Ps$, and preferably, Q is about $2 \times Ps$.

The control unit 420 controls the charge density Q based, for example, on the following equation: $Q = I \times \Delta t / S$ (where Q is the charge density; I is the beam current emitted from the ion beam source 410; $\Delta t$ is the length of time for which the ion beam is irradiated; and S is the area irradiated with the ion beam). The control unit 420 may store Ps values for different ferroelectric single crystals 200 in advance.

The apparatus 400 may further include a translocation unit (not shown) for moving the ion beam source 410 or the ferroelectric single crystal 200. The translocation unit makes it possible to draw a pattern by the ion beam irradiated onto the ferroelectric single crystal 200. If the control unit 420 stores a pattern in advance, the movement of the translocation unit may be controlled.

The apparatus 400 of the present invention is less costly since it can be constructed by arranging the control unit 420 in an existing focused ion beam emitter. In addition, since the charge density Q is controlled by the control unit 420, the polarization can be reversed only in a desired region of the ferroelectric single crystal 200. Moreover, the apparatus 400 enables simple and economical production of nanometer-order fine polarization-reversed structures, which have been difficult to be produced by the conventional technologies.

As described above, the method and the apparatus of the present invention reduce the lateral expansion of electric field distribution since the ion beam is irradiated onto the ferroelectric single crystal so that the charge density Q satisfies $0.7 \times Ps \leq Q \leq 5 \times Ps$. Thus, the method and the apparatus of the present invention can be used to form nanometer-order polarization-reversed regions.

The control layer, which is preferably deposited on the side of the ferroelectric single crystal irradiated with the ion beam, further decreases the lateral expansion of electric field distribution caused by the irradiated ions. This facilitates fine processing.

While the method of the present invention has been described in relation to the ferroelectric single crystal for optical applications, the method of the present invention may also be applied to other materials, such as $SrBi_2Ta_2O_9$ (SBT), (PbLa) $(ZnTi)O_3$(PLZT), $PbZr_xTi_{1-x}O_3$ (PZT) and $Sr_{1-x}Ba_x$-$TiO_3$ (SBO). In addition to optical applications, these materials can be used in microelectromechanical systems (MEMS) and piezoelectric applications. The method of the present invention can also be applied to organic ferroelectric materials.

Although only positively charged ion species have been described for use in the method and the apparatus of the present invention, the method and the apparatus of the present invention may also be applied to negatively charged ion species such as $F^-$ and $Cl^-$. When a negative ion species is used, the first surface to be grounded in Step S110 (FIG. 1) becomes +Z surface (+C surface) and the second surface on which the ion beam is irradiated becomes −Z surface (−C surface). It should be noted, however, that the requirement for the charge density Q required to reverse the polarization is the same as that for the positively charged ion.

Embodiment 2

An exemplary application of a one-dimensional photonic crystal manufactured by the method of Embodiment 1 will now be described.

Figure 5:
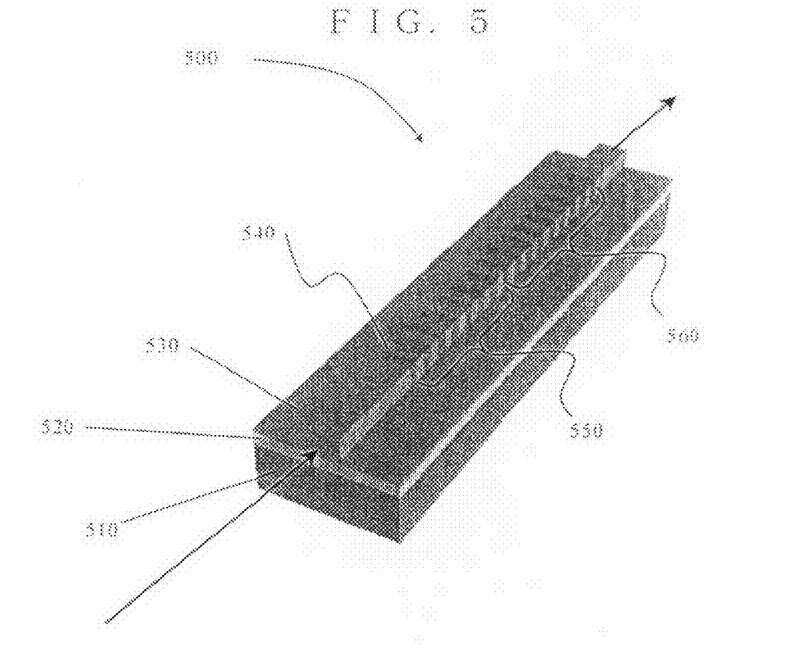
FIG. 5 is a schematic diagram showing a wavelength converter manufactured by a method of the present invention for forming a polarization-reversed region described in Embodiment 1.

FIG. 5 is a schematic diagram showing a wavelength converter manufactured by the method of the present invention for forming a polarization-reversed region described in Embodiment 1.

The wavelength converter 500 includes a substrate 510, a cladding layer 520 disposed on the substrate 510 and a ferroelectric single crystal 530 disposed on the cladding layer 520. Formed on the ferroelectric single crystal 530 is a ridge-shaped waveguide 540 through which light is guided.

While the substrate 510 may be any substrate that has a coefficient of thermal expansion close to that of the ferroelectric single crystal 530, it may be formed, for example, of Si, glass, CLN, CLT, SLN or SLT. What is meant by saying "coefficient of thermal expansion is close" is that the substrate 510 and the ferroelectric single crystal 530 do not separate or break upon heating or processing.

While the cladding layer 520 may be any cladding layer that has a lower refractive index than that of the ferroelectric single crystal 530, it may be formed of $SiO_x$ ($1 \leq x \leq 2$). Since the ferroelectric single crystal 530 has a higher refractive index than that of air, light guided through the ridge-shaped waveguide 540 is effectively confined within the ridge-shaped waveguide 540. As a result, the light leakage is reduced and a high efficiency and high output can be achieved.

A gap (not shown) may be provided between the substrate 510 and the ferroelectric single crystal 530 so that the air layer can serve as the cladding layer 520. The air layer has a lower refractive index than that of the cladding layer 520 formed of $SiO_x$ or a similar material and can therefore enhance the light confinement effect.

While the ferroelectric single crystal 530 may be any ferroelectric single crystal that can be used in Embodiment 1, it is preferably CLN, CLT, SLN or SLT as described in Embodiment 1. The ridge-shaped waveguide 540 includes a first polarization-reversed region 550 and a second polarization-reversed region 560. The first and the second polarization-reversed regions 550 and 560 can be produced by the method described in Embodiment 1.

The periodicity of the first polarization-reversed region 550 is adjusted so that light entering the ferroelectric single crystal 530 and having a first wavelength $\lambda_1$ is matched in phase with the second harmonic, generating light with a second wavelength $\lambda_2$ ($=\lambda_1/2$). Likewise, the periodicity of the second polarization-reversed region 560 is adjusted so that light with the first wavelength $\lambda_1$, light with the second wavelength $\lambda_2$ and the third harmonic are matched in phase with each other, generating light with a third wavelength $\lambda_3$ ($=1/(1/\lambda_1+1/\lambda_2)$). It should be noted that the periodicity of the polarization-reversal can vary depending on the ferroelectric single crystal 530.

For example, when the ferroelectric single crystal 530 is SLN and the first wavelength $\lambda_1$ is 1064 nm, the periodicity of the first polarization-reversed region 550 is 6 to 7 μm and the periodicity of the second polarization-reversed region 560 is 1 to 2 μm. As used herein, the term "periodicity of polarization-reversed region" refers to the total length of a part of the ridge-shaped waveguide 540 in which the polarization is reversed and an adjacent part in which the polarization is not reversed. Thus, if the periodicity of the second polarization-reversed region 560 is 1 to 2 μm, the length of each polarization-reversed part can be in the order of nanometers.

The operation of an exemplary wavelength converter 500 is now described. In the wavelength converter 500, the ferroelectric single crystal 530 is SLN, the periodicity of the first polarization-reversed region 550 is 6.2 μm, and the periodicity of the second polarization-reversed region 560 is 2.4 μm.

The wavelength converter 500 may be used with a light source (not shown). The light source may be a semiconductor laser or optical fiber that emits a first light (fundamental wave) with a first wavelength $\lambda_1$ of 1064 nm. Other light sources may also be used. The light source may be any coherent light source. When the light source is a semiconductor laser, it may further include a light-converging optical system (not shown). The light-converging optical system may be any optical system that can focus and direct the first light to the wavelength converter 500.

The first light emitted by the light source passes through the light-converging optical system and enters the ridge-shaped waveguide 540 of the wavelength converter 500. The first polarization-reversed region 550 in the ridge-shaped waveguide 540 causes the phase-matching (quasi phase-matching) of the fundamental wave and its second harmonic. As a result, the fundamental wave is converted to a second light (second harmonic) having a second wavelength $\lambda_2$ of 532 nm as it propagates through the first polarization-reversed region 550.

The first light and the second light then enter the second polarization-reversed region 560, where the fundamental wave (first light), the second light and light having a sum frequency of the fundamental wave and the second light are matched in phase with each other. As a result, a third light having a third wavelength $\lambda_3$ of 354 nm (third harmonic) is generated. The wavelength converter 500 can be made into a resonator by providing a reflective film on the light incident surface and the light-emitting surface of the wavelength converter 500.

Produced by the method described in Embodiment 1, the first and the second polarization-reversed regions 550 and 560 have a shorter periodicity and are more uniform than the conventional structures.

This construction even enables third harmonic generation (THG) and fourth harmonic generation (FHG), which have been difficult to achieve thus far. It should be noted that the wavelength converter 500 can also be used for the purposes of parametric oscillation and difference frequency generation.

Embodiment 3

An exemplary application of a two-dimensional photonic crystal manufactured by the method of Embodiment 1 will now be described.

Figure 6:
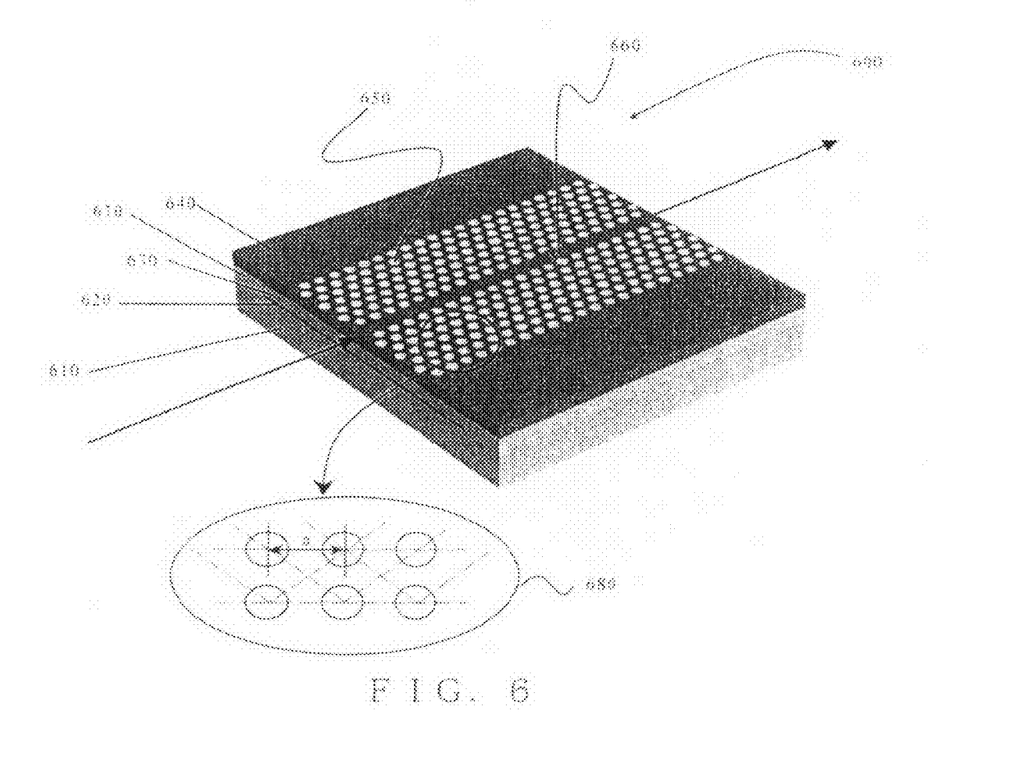
FIG. 6 is a schematic diagram showing a device manufactured by the method of the present invention for forming a polarization-reversed region described in Embodiment 1.

FIG. 6 is a schematic diagram showing a device manufactured by the method of the present invention for forming a polarization-reversed region described in Embodiment 1.

The device 600 includes a substrate 610, an electrode layer 620 disposed on the substrate, a cladding layer 630 disposed on the electrode layer 620, and a slab layer 640 disposed on the cladding layer 630.

While the substrate 610 may be any substrate that has a coefficient of thermal expansion close to that of the cladding layer 630 or the slab layer 640, it may be formed, for example, of Si, glass, CLN, CLT, SLN or SLT.

The electrode layer 620 may be formed of a metal material such as Cr, Pt and AuPd.

While the cladding layer 630 may be formed of any material that has a lower refractive index than that of the ferroelectric single crystal that forms the slab layer 640, it may be formed, for example, of $SiO_x$. Since the ferroelectric single crystal has a higher refractive index than that of air, light is effectively confined within the slab layer 640, enabling high efficiency and high output.

The slab layer 640 contains a plurality of periodically arranged holes 650. The plurality of holes 650 serves to prevent the propagation of light having a wavelength in a specific range. In other words, the holes 650 can Bragg reflect light in a specific wavelength range (have a photonic band gap for the wavelength range). The specific wavelength range is determined by the periodicity of the plurality of holes 650.

For example, assuming that $\lambda$ is the wavelength in vacuum of light incident upon the device 600, the periodicity (or grating constant) of the plurality of holes 650 is in the range of $0.3\times\lambda$ to $0.6\times\lambda$ when the ferroelectric single crystal is CLN, CLT, SLN or SLT.

The periodicity (grating constant) of the plurality of holes 650 is indicated in FIG. 6 by an arrow a (inserted diagram 680). The plurality of holes 650 arranged with a periodicity equivalent to wavelengths can be produced by the method described in Embodiment 1. Assuming that $\lambda$ is the wavelength of light incident upon the slab layer 640, the thickness of the slab layer 640 is in the range of $\lambda/2$ to $2\times\lambda$. The slab layer 640 having such a thickness can confine the incident light in the lateral mode.

In Embodiment 3, the slab layer 640 includes a line defect 660 as a part of the plurality of holes 650. As used herein, the term "defect" refers to a part of the plurality of periodically arranged holes in which the holes are missing. Since such a defect only allows the propagating of light having a wavelength in a specific range, a waveguide is formed by a continuous defect. In Embodiment 3, the line defect 660 serves as a waveguide that linearly guides only light in a specific wavelength range.

Unlike conventional waveguides that take advantage of total reflection, the waveguide of the present invention utilizes the photonic band gap formed by the plurality of holes 650. When it is desired to bend light using a conventional waveguide, the waveguide needs to have a radius of curvature (for example, 100 μm) that meets the condition for total reflection to prevent light from seeping out. In contrast, the waveguide of the present invention may be formed into any shape and can bend light by simply forming a defect where bending of light is desired. Thus, the present invention makes it possible to design a significantly sharper waveguide (for example, a few micrometers). It should be understood that the defect may be designed to have any desired geometry other than straight line. For example, the defect may be designed as a kink-like defect (for example, right angle defect) or as a combination of a line defect and a point defect depending on the application of the device.

The device 600 may include a spacer 670 between the substrate 610 and the slab layer 640. The spacer 670 may be formed, for example, of $SiN_x$ (1<x<2) and may support the slab layer 640.

Specific operation of the device 600 used with light at a wavelength of 1.55 μm will now be described. The device 600 uses a ferroelectric single crystal of SLN that contains a plurality of holes 650 formed at a periodicity of 0.7 μm (=0.45$\lambda$) and a line defect 660. The plurality of holes 650 each has a diameter of about 0.2 μm. The slab layer 640 has a thickness of 2 to 3 μm. The cladding layer 630 is formed of $SiO_2$ and has a thickness of 1.4 μm. It should be understood that the specific construction is provided by way of example only and the present invention is not limited to such a construction.

The device 600 may be used with a light source (not shown). The light source may be a semiconductor laser or optical fiber that emits light with a wavelength of 1.55 μm. Other light sources may also be used. When the light source is a semiconductor laser, it may further include a light-converging optical system (not shown). The light-converging optical system may be any optical system that can focus and direct light to the device 600.

The light emitted by the light source passes through the light-converging optical system and enters the slab layer 640 of the device 600. Of the light entering the slab layer 640, light having a wavelength of 1.4 μm to 1.75 μm cannot propagate through the slab layer 640, but only light having a wavelength of 1.55 μm can travel through the line defect 660. It should be noted, however, that only light that meets the condition for the wave number and frequency determined by the guide mode can propagate through the line defect 660. The device 600 having such a construction can serve as an ultra-small waveguide (a few micrometers).

The slab layer 640 may contain a point defect (not shown) that confines light within it. In such a case, the device 600 may function as an ultra-small resonator. A composite defect comprising the line defect 660 and a point defect (not shown) may be employed in order to split the incident light into a Y-branch, bend the light at a right angle, or combine different lights. Active control of incident light is also possible by making use of the electro-optic effect of the ferroelectric single crystal. A person skilled in the art will readily design a desired defect to control light in a desired manner.

While the cladding layer 630 shown in FIG. 6 is formed of $SiO_2$, the cladding layer 630 (and the electrode layer 620) may be removed by etching to form an air layer (not shown). In such a case, the slab layer 640 is sandwiched between air layers and can therefore confine light more effectively due to the greater difference in refractive index.

The present invention will now be described with reference to specific examples. It should be understood, however, that these examples are provided by way of example only and are not intended to limit the scope of the invention.

EXAMPLE 1

Using a focused ion beam (FIB) (FB-2100, Hitachi High-Technologies Co., Japan), polarization-reversed regions were formed on CLN. The conditions for the operation of FIB were as follows: acceleration voltage=40 kV, beam current=1.45 nA, exposure time=10 μsec, and beam diameter=70 to 80 nm per unit irradiation area ($1 \times 10^{-10}$ $cm^2$). The ion used was $Ga^+$. The thickness of CLN was 100 μm.

Figure 7:
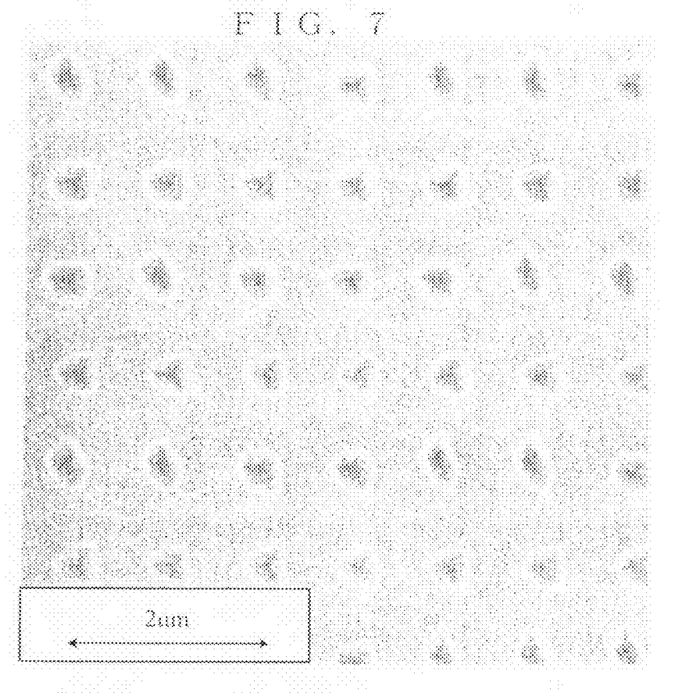
FIG. 7 is a SEM image of the +Z surface of a two-dimensional photonic crystal CLN.

Specifically, AuPd (gold-palladium alloy) electrode was deposited on the −Z surface of the CLN by sputtering. The electrode was grounded. The ion beam was irradiated onto the +Z surface opposite to the grounded surface using the aforementioned conditions and the irradiation spot was moved. The beam was irradiated over a region of 0.25 $\mu m^2$ (25 unit irradiation areas). This was repeated to obtain multiple irradiation regions. Subsequently, the +Z surface was etched with an etchant (hydrofluoric acid:nitric acid=1:0). The etched +Z surface was observed with a scanning electron microscope (SEM) (S-4100, Hitachi, Japan). The acceleration voltage of SEM was 40 kV. The results are shown in FIG. 7 and will be described later.

EXAMPLE 2

Figure 8:
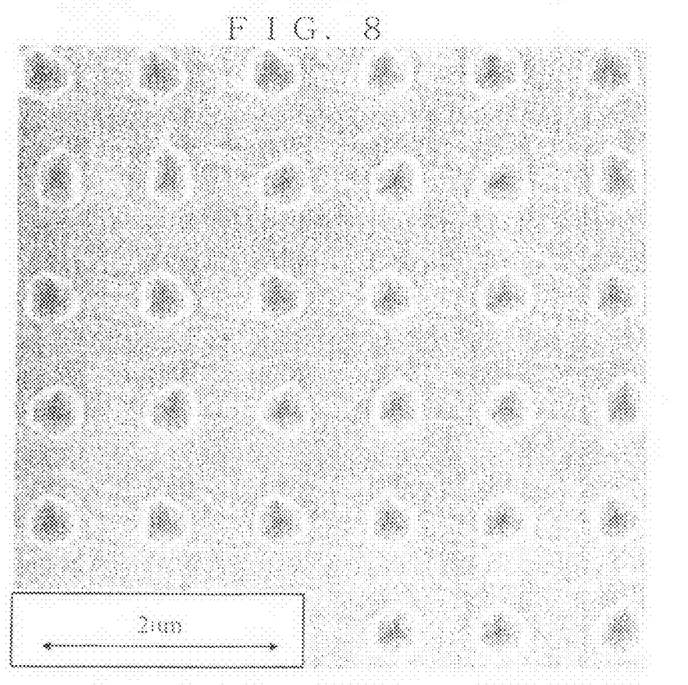
FIG. 8 is a SEM image of the +Z surface of a two-dimensional photonic crystal SLN.

SLN was used as the ferroelectric single crystal. The rest of the procedure was the same as in Example 1 and the same description will not be repeated here. The surface observed is shown in FIG. 8 and will be described later.

EXAMPLE 3

Figure 9:
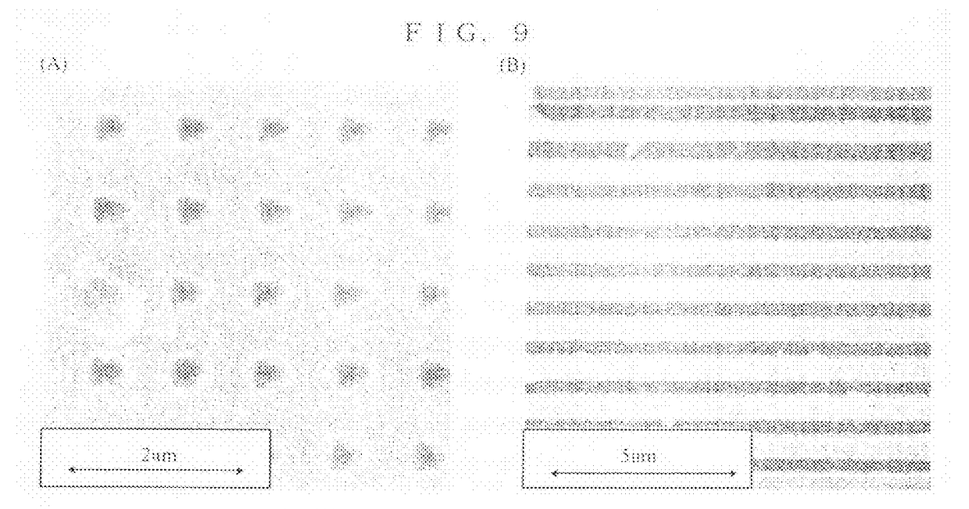
FIG. 9 is SEM images of the +Z surfaces of a two-dimensional photonic crystal CLT (A) and a one-dimensional photonic crystal CLT (B).

Polarization-reversed regions were formed on CLT used as the ferroelectric single crystal by FIB operated under the same conditions as in Example 1. The thickness of CLT was 100 μm. Specifically, Cr electrode was deposited on the −Z surface of the CLT by sputtering. The electrode was grounded. The ion beam was irradiated onto the +Z surface opposite to the grounded surface using the aforementioned conditions and the irradiation spot was moved. The beam was irradiated over a region of 0.25 $\mu m^2$ (25 unit irradiation areas). This was repeated to obtain multiple irradiation regions. Another CLT, grounded in the same manner, was irradiated continuously and linearly the ion beam on the +Z surface opposite to the grounded surface under the aforementioned conditions. Each CLT was then etched on the +Z surface with an etchant (hydrofluoric acid:nitric acid=1:0). The etched +Z surface of each CLT was observed with SEM. The results are shown in FIG. 9 and will be described later.

EXAMPLE 4

Figure 10:
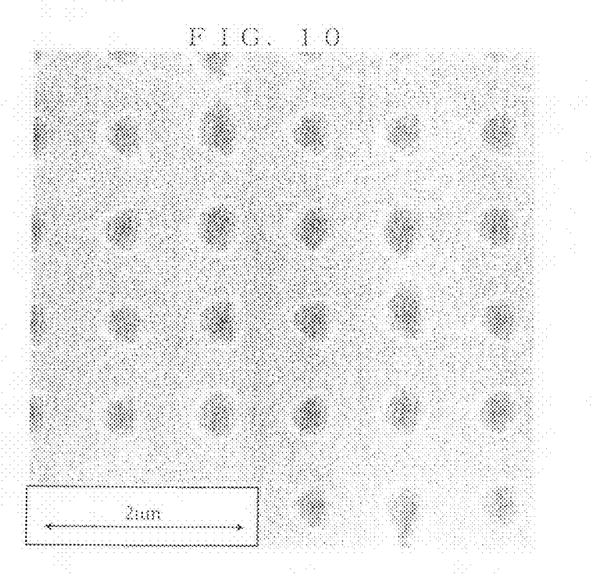
FIG. 10 is a SEM image of the +Z surface of a two-dimensional photonic crystal SLT.

SLT was used as the ferroelectric single crystal. The rest of the procedure was the same as in Example 1 and the same description will not be repeated here. The surface observed is shown in FIG. 10 and will be described later.

EXAMPLE 5

Using FIB, polarization-reversed regions were formed on SLN. The conditions for the operation of FIB were as follows: acceleration voltage=40 kV, beam current=1.52 nA, exposure time=10 μsec, and beam diameter=70 to 80 nm per unit irradiation area ($1 \times 10^{-10}$ $cm^2$). The ion used was $Ga^+$. The thickness of SLN was 100 μm.

Figure 11:
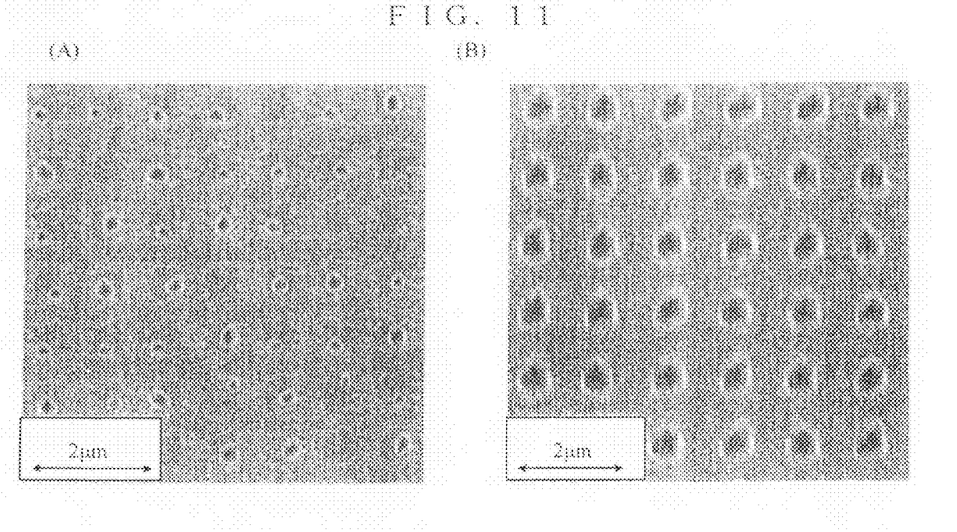
FIG. 11 is SEM images of the +Z surfaces of a two-dimensional photonic crystal SLN (A) (without insulation layer) and a two-dimensional photonic crystal SLN (B) (with insulation layer).

Specifically, AuPd electrode was deposited on the −Z surface of the SLN by sputtering. The electrode was grounded. The ion beam was irradiated onto the +Z surface opposite to the grounded surface using the aforementioned conditions. The beam was irradiated onto irradiation regions, each achieving 0.09 $\mu m^2$ (9 unit irradiation areas). Subsequently, the +Z surface was etched with an etchant (hydrofluoric acid: nitric acid=1:0). The etched +Z surface was observed with SEM. The acceleration voltage of SEM was 40 kV. The results are shown in FIG. 11(A) and will be described later.

EXAMPLE 6

The same procedure was followed as in Example 5, except that the +Z surface of SLN had the control layer, which was formed by applying PMMA and curing the PMMA by heating it at about 170° C. for 30 minutes. The thickness of the PMMA layer was 300 nm. The observed +Z surface of SLN having the control layer is shown in FIG. 11(B) and will be described later.

The relationship between the charge density Q and the spontaneous polarization Ps is shown below for Examples 1 through 6. The spontaneous polarization is 71 $\mu C/cm^2$ for CLN and SLN and 50 $\mu C/cm^2$ for CLT and SLT. The charge density Q is determined by the following relationship: charge density Q=(beam current×exposure time/irradiation area).

Example 1: Q=2.04×Ps
Example 2: Q=2.04×Ps
Example 3: Q=2.84×Ps
Example 4: Q=2.84×Ps
Example 5: Q=2.14×Ps
Example 6: Q=2.14×Ps As shown, the charge density satisfies the relationship 0.7× Ps≦Q≦5×Ps in each Example.

FIG. 7 is the SEM image of the +Z surface of the two-dimensional photonic crystal CLN.

In this figure, multiple holes, each having a diameter of about 400 nm, can be seen. The holes are regularly arranged at specific periodicity and are uniform in shape. This demonstrates that nanometer-order polarization-reversed regions were successfully formed by the method of the present invention. The diameter of the resulting holes was smaller than that of the irradiation regions. This was considered to be due to the relatively short etching time.

FIG. 8 is the SEM image of the +Z surface of the two-dimensional photonic crystal SLN.

In this figure, multiple holes, each having a diameter of about 410 nm, can be seen. The holes are regularly arranged at specific periodicity and are uniform in shape. As is the case with CLN, this demonstrates that nanometer-order polarization-reversed regions were successfully formed by the method of the present invention. Despite the fact that the coercive field (electrical field required to reverse the polarization) for SLN is about one-fifth that for CLN, polarization-reversed regions having substantially the same size as those obtained in CLN were formed by FIB using the same conditions as with CLN. This suggests that the polarization reversal by ion beams is affected by the spontaneous polarization Ps of a given material, rather than the specific coercive field of the material. According to the method of the present invention, the polarization of CLN, the ferroelectric material that requires high coercive field for polarization reversal and has been considered difficult to reverse its polarization by applying electrical field, could be readily reversed as long as the relationship described in Embodiment 1 with respect to the spontaneous polarization Ps is satisfied. Thus, the method of the present invention can be advantageously used even with materials that have a high coercive field for polarization reversal.

FIG. 9 shows the SEM images of the +Z surfaces of the two-dimensional photonic crystal CLT (A) and the one-dimensional photonic crystal CLT (B).

FIG. 9(A) shows multiples holes, each having a diameter of about 430 nm. The holes are regularly arranged at specific periodicity and are uniform in shape. This demonstrates that nanometer-order polarization-reversed regions were successfully formed by the method of the present invention.

FIG. 9(B) shows multiple grooves each having a width of about 480 nm (seen as dark areas). The grooves are highly uniform with none overlapping each other. Thus, it has been demonstrated that the method of the present invention is suitable not only for the formation of spot-like polarization-reversed regions as shown in FIG. 9(A), but also for the formation of the linear nanometer-order polarization-reversed regions.

FIG. 10 is the SEM image of the +Z surface of the two-dimensional photonic crystal SLT.

FIG. 10 shows multiples holes, each having a diameter of about 520 nm. Although some holes are merged together, most of the holes are regularly arranged at specific periodicity and are uniform in shape. As is the case with CLT, this demonstrates that nanometer-order polarization-reversed regions were formed by the method of the present invention. The holes formed on the SLT were larger in size than the holes formed on the CLT, indicating that SLT can more readily undergo polarization reversal than CLT.

FIG. 11 shows the SEM images of the +Z surfaces of the two-dimensional photonic crystal SLN (A) (without a control layer) and the two-dimensional photonic crystal SLN (B) (with a control layer).

FIG. 11(A) shows multiples holes, each having a diameter in the range of about 230 nm to about 300 nm. Although the periodicity and the shape of the holes are somewhat irregular, small-size polarization-reversed regions are formed.

In comparison, FIG. 11(B) shows that multiple holes, each having a diameter of about 280 nm, were formed when the PMMA control layer was deposited. The holes are regularly arranged at specific periodicity and are highly uniform in shape, indicating that the control layer facilitates the accurate formation of smaller-size polarization-reversal regions. The control layer also prevented the direct penetration of the ion beam into the sample, protecting the sample from damages. Similar results were obtained when ZEP520 was used in place of PMMA.

EXAMPLE 7

As in Example 1, polarization-reversed regions were formed on SLN by a focused ion beam (FIB). The conditions for the operation of FIB were as follows: acceleration voltage=40 kV, beam current=1.45 nA, and beam diameter=70 to 80 nm per unit irradiation area ($1 \times 10^{-10}$ cm$^2$). The ion used was Ga$^+$. The thickness of SLN was 100 µm.

Specifically, AuPd (gold-palladium alloy) electrode was deposited on the −Z surface of the SLN by sputtering. The electrode was grounded. The ion beam was irradiated onto the +Z surface opposite to the grounded surface using the aforementioned conditions. The beam was irradiated onto multiple irradiation regions, each having 1 µm$^2$ (100 unit irradiation areas). The regions were irradiated with the ion beam for time periods of 3 µsec, 10 µsec, 30 µsec and 100 µsec per unit irradiation area. Subsequently, the +Z surface was etched with an etchant (hydrofluoric acid:nitric acid=1:0) for a sufficiently long time. The etched +Z surface was then observed with SEM and the relationship between the domain (polarization-reversed region) and the charge density Q was determined. The results are shown in FIG. 12.

Figure 12:
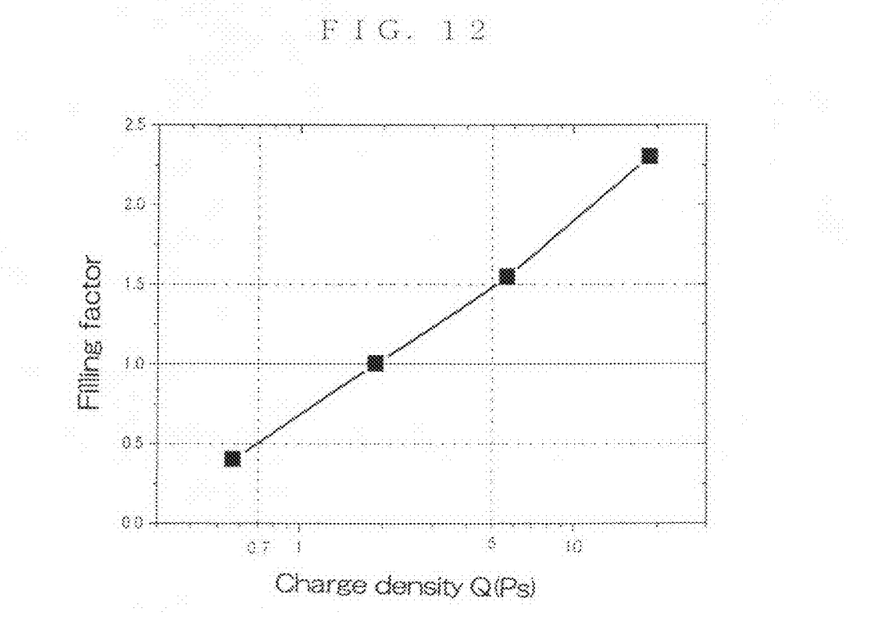
FIG. 12 is a diagram showing the relationship between the domain size and the charge density.

FIG. 12 is a diagram showing the relationship between the domain size and the charge density.

The vertical axis represents the domain size normalized to 1 µm$^2$ (filling factor) while the horizontal axis represents the logarithm of the charge density Q as measured based on the Ps of SLN.

FIG. 12 indicates that the polarization-reversed region is formed to have the intended area (1 µm$^2$ in Example 7) when the filing factor is 1, and that the size of the polarization-reversed region becomes larger or smaller than the intended area as the filling factor becomes larger or smaller than 1. It is known that, in general, the operation of the device is not significantly affected when the filling factor is in the range of 0.5 to 1.5 (preferably, 1).

The acceptable range of filling factor is now described in detail by taking as an example a quasi-phase-matched wavelength converter having a periodic polarization-reversed structure. It is known that, assuming that L is the width of a polarization-reversed region and the Λ is the periodicity of the polarization-reversed region, the wavelength conversion efficiency is proportional to $\sin^2(\pi \times L/\Lambda)$ (See, for example, M. M. Fejer et al. *IEEE Journal of Quantum Electronics* Vol. 28, pp. 2631 (1992)).

In designing wavelength converter with Duty (D)=0.5 (where D=L/Λ), wavelength converters that exhibit filling factors for D of 0.5 and 1.5 are analyzed for the wavelength conversion efficiency. It is known that wavelength converters having filling factors of 0.5 and 1.5 each give 50% wavelength conversion efficiencies relative to the wavelength conversion efficiency of the wavelength converter with a filling factor of 1.0. Thus, a wavelength converter is considered to be acceptable for practical use when its filling factor is in the range of 0.5 to 1.5. The acceptable range of filling factor (0.5 to 1.5) is applicable to a wide range of devices using polarization-reversed structures.

Referring again to FIG. 12, it can be seen that the filling factor falls within the range of 0.5 to 1.5 when the charge density is in the range of $0.7 \times Ps \leq Q \leq 5 \times Ps$ (In other words, the size of the polarization-reversed regions are within ±50% of the intended size (1 μm² in Example 7)). It can be also seen that the filling factor is 1 when the charge density is about 2×Ps (polarization-reversed regions have the intended size).

These observations indicate that when polarization-reversed regions are formed by the method of the present invention, the charge density satisfies $0.7 \times Ps \leq Q \leq 5 \times Ps$ and is preferably about 2×Ps.

INDUSTRIAL APPLICABILITY

The method and the apparatus for forming a polarization-reversed region according to the present invention can form nanometer-order polarization-reversed regions in a ferroelectric single crystal. Thus, the method and the apparatus will make it possible to design smaller and finer devices. The technology of the present invention facilitates the production of two-dimensional photonic crystals comprising ferroelectric single crystals that are required to achieve ultra-small devices such as point-defect resonators and line-defect waveguides. In addition, the present invention is expected to facilitate the development of novel devices by taking advantage of the interaction between photonic crystals and nanoscale microspaces.

The invention claimed is:

1. A method for forming a polarization-reversed region in a ferroelectric single crystal, comprising the steps of:
   grounding a first surface of the ferroelectric single crystal; and
   irradiating a second surface of the ferroelectric single crystal opposite to the first surface with an ion beam, the ion beam being irradiated such that the charge density Q (μC/cm²) accumulated on the second surface by the ion beam satisfies the following relationship:

$$0.7 \times Ps \leq Q \leq 5 \times Ps$$

where Ps is the spontaneous polarization (μC/cm²) of the ferroelectric single crystal.

2. The method according to claim 1, further comprising, subsequent to the irradiating step, the step of etching the ferroelectric single crystal.

3. The method according to claim 1, wherein the irradiating step is carried out such that the charge density Q satisfies the following relationship:

$$1.8 \times Ps \leq Q \leq 2.2 \times Ps.$$

4. The method according to claim 1, wherein the ferroelectric single crystal is selected from the group consisting of substantially stoichiometric lithium niobate (SLN), substantially stoichiometric lithium tantalate (SLT), congruent lithium niobate (CLN) and congruent lithium tantalate (CLT).

5. The method according to claim 4, wherein, when the ferroelectric single crystal is substantially stoichiometric lithium niobate (SLN) or substantially stoichiometric lithium tantalate (SLT), the ferroelectric single crystal contains 0.1 to 3.0 mol % of an element selected from the group consisting of Mg, Zn, Sc and In.

6. The method according to claim 4, further comprising, subsequent to the irradiating step, the step of etching the ferroelectric single crystal with an etchant containing hydrofluoric acid and nitric acid at a predetermined ratio.

7. The method according to claim 1, wherein the ferroelectric single crystal has a thickness in the range of λ/2 to 2×λ where λ is the wavelength of light incident upon the ferroelectric single crystal.

8. The method according to claim 1, wherein the irradiating step comprises irradiating the ion beam at an acceleration voltage in the range of 20 KeV to 40 KeV.

9. The method according to claim 1, wherein the ion species of the ion beam is gallium ion.

10. The method according to claim 1, further comprising, prior to the irradiating step, the step of depositing a control layer on the second surface.

11. The method according to claim 10, wherein the control layer is PMMA or ZEP520.

12. The method according to claim 10, wherein the control layer has a thickness in the range of 50 nm to 500 nm.

13. The method according to claim 1, wherein the grounding step further comprises the steps of:
   depositing an insulation layer on the first surface; and
   depositing an electrode layer on the insulation layer, the insulation layer having a lower refractive index than that of the ferroelectric single crystal.

14. The method according to claim 1, wherein the grounding step further comprises the steps of:
   depositing a transparent electrode layer on the first surface; and
   depositing an insulation layer on the electrode layer, the insulation layer having a lower refractive index than that of the ferroelectric single crystal.

15. The method according to claim 13, further comprising the step of removing the insulation layer.

* * * * *